(12) United States Patent
Cline

(10) Patent No.: US 7,373,534 B2
(45) Date of Patent: May 13, 2008

(54) REDUCING STORAGE DATA TRANSFER INTERFERENCE WITH PROCESSOR POWER MANAGEMENT

(75) Inventor: Leslie E. Cline, Sunnyvale, CA (US)

(73) Assignee: Intel Corporation, Santa Clara, CA (US)

(*) Notice: Subject to any disclaimer, the term of this patent is extended or adjusted under 35 U.S.C. 154(b) by 426 days.

(21) Appl. No.: 11/165,157

(22) Filed: Jun. 23, 2005

(65) Prior Publication Data

US 2006/0294406 A1 Dec. 28, 2006

(51) Int. Cl.
*G06F 1/00* (2006.01)
(52) U.S. Cl. .................... 713/320; 713/323
(58) Field of Classification Search .......... 713/320, 713/323
See application file for complete search history.

(56) References Cited

U.S. PATENT DOCUMENTS

2006/0200690 A1* 9/2006 Cline et al. ............... 713/320

* cited by examiner

*Primary Examiner*—Rehana Perveen
*Assistant Examiner*—Tse Chen
(74) *Attorney, Agent, or Firm*—Blakely, Sokoloff, Taylor & Zafman LLP

(57) ABSTRACT

Systems and methods of managing power consumption provide for placing a processor in a non-snoopable state while a storage interface associated with the processor is enabled for bus mastering. In one embodiment, the bus mastering results in traffic between the storage interface and a storage device, where the traffic is monitored and the processor is placed a snoopable state when traffic is moving, and in the non-snoopable idle state if the traffic ceases for a period of time.

14 Claims, 4 Drawing Sheets

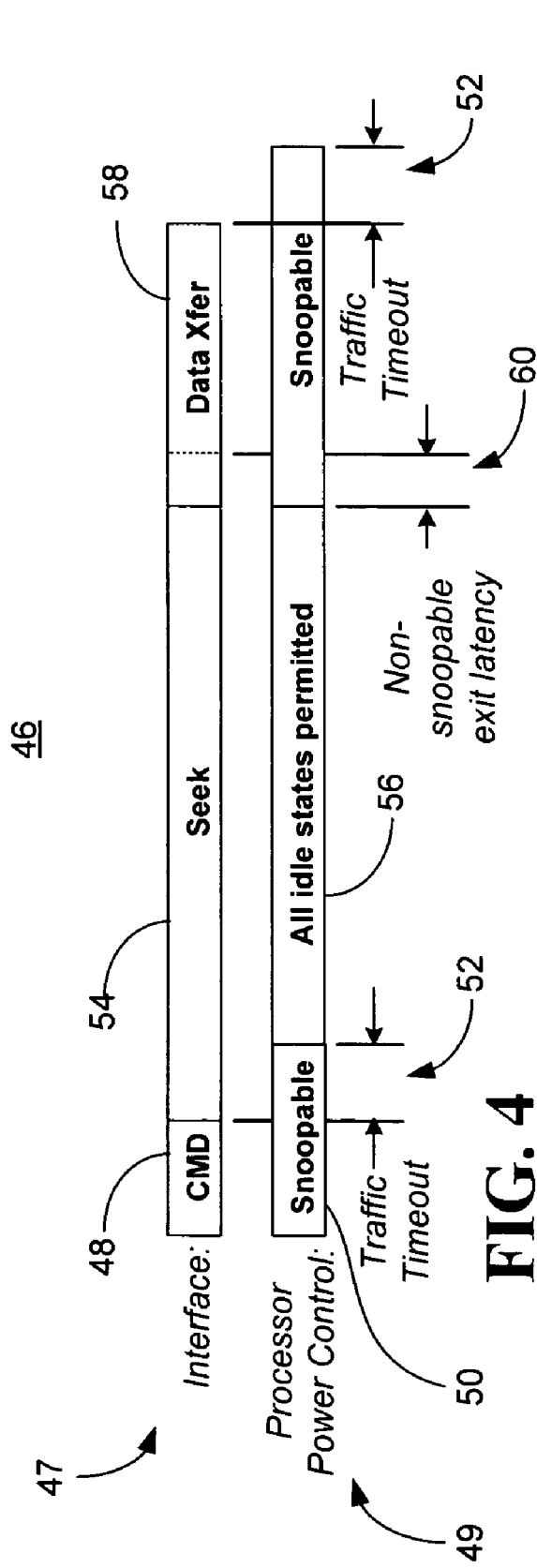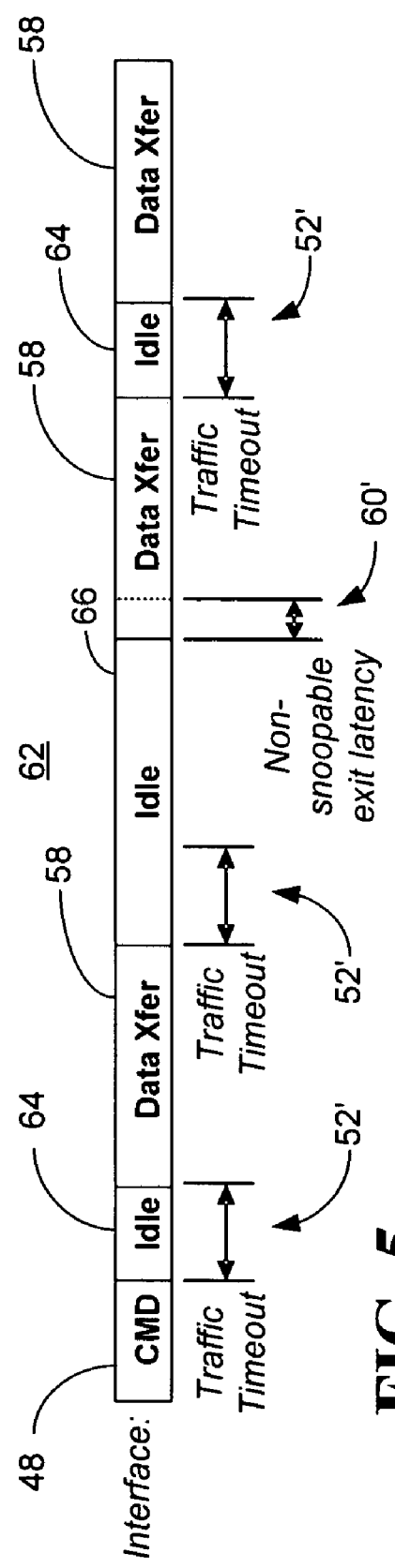

REDUCING STORAGE DATA TRANSFER INTERFERENCE WITH PROCESSOR POWER MANAGEMENT

BACKGROUND

1. Technical Field

Some embodiments of the present invention generally relate to power management. In particular, certain embodiments relate to managing power in computing systems.

2. Discussion

As the trend toward advanced central processing units (CPUs) with more transistors and higher frequencies continues to grow, computer designers and manufacturers are often faced with corresponding increases in power and energy consumption. Furthermore, manufacturing technologies that provide faster and smaller components can at the same time result in increased leakage power. Particularly in mobile computing environments, increased power consumption can lead to overheating, which may negatively affect performance, and can significantly reduce battery life.

Because batteries typically have a limited capacity, running the processor of a mobile computing system more than necessary could drain the capacity more quickly than desired. Some modern mobile computing systems therefore attempt to conserve power by placing the processor in various low power/idle states when there are no instructions to be executed. While idle states can be effective, the ability to place the processor in the idle power states may be constrained by other components of the system. For example, when reading or writing to a storage device such as a hard disk drive (HDD), an integrated drive electronics (IDE) controller generally prevents the processor from entering the deeper idle states because the cache of the processor does not support coherency in these states.

Cache coherency is essentially a protocol for managing the caches of a system so that no data is lost or overwritten before the data is transferred from a cache to the target memory. Thus, conventional storage controllers typically inhibit deep idle states while enabled for bus mastering in order to ensure that the processor caches are kept coherent. There may be periods of time before and after actual storage data transfer, however, in which the prohibition against non-snoopable idle states may be unnecessary. The result may be additional power consumption and/or reduced battery life. This issue can be particularly challenging for storage intensive workloads such as DVD playback, audio playback, multimedia content creation/viewing, gaming, and others.

BRIEF DESCRIPTION OF THE DRAWINGS

The various advantages of the embodiments of the present invention will become apparent to one skilled in the art by reading the following specification and appended claims, and by referencing the following drawings, in which:

FIG. 4 is a timing diagram of an example of a power management policy according to one embodiment of the invention;

FIG. 5 is a timing diagram of a storage data transfer sequence according to one embodiment of the invention.

DETAILED DESCRIPTION

In the following description, for purposes of explanation, numerous specific details are set forth in order to provide a thorough understanding of the embodiments of the present invention. It will be evident, however, to one skilled in the art that the embodiments of the present invention may be practiced without these specific details. In other instances, specific apparatus structures and methods have not been described so as not to obscure the embodiments of the present invention. The following description and drawings are illustrative of the embodiments of the invention and are not to be construed as limiting the embodiments of the invention.

Some portions of the detailed description, which follow, may be presented in terms of algorithms and symbolic representations of operations on data bits or binary digital signals within a computer memory. These algorithmic descriptions and representations may be the techniques used by those skilled in the data processing arts to convey the substance of their work to others skilled in the art. For example, certain logic described herein may be implemented using hardware techniques such as complementary metal oxide semiconductor (CMOS) technology or transistor-transistor logic (TTL), controller firmware, microcode, software techniques, and any combination thereof. The components described herein may also be incorporated into one or more integrated circuit (IC) packages (i.e., chips) which are fabricated on a die cut from a wafer. Any use of the terms "first", "second", etc. does not necessarily infer a chronological relationship, and is used to facilitate discussion only.

Unless specifically stated otherwise, as apparent from the following discussions, it is appreciated that throughout the specification, discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Figure 1:
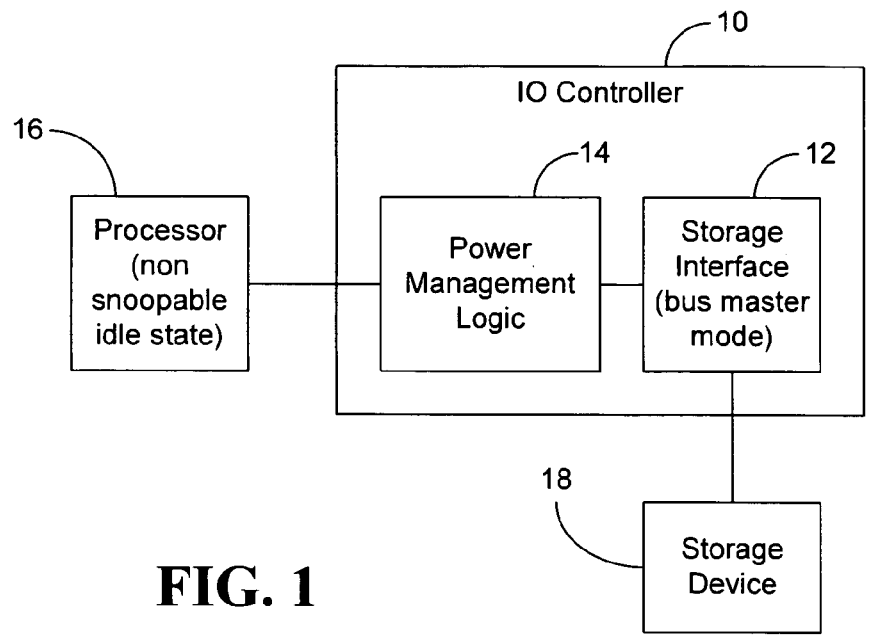
FIG. 1 is a block diagram of an example of an input/output (IO) controller according to one embodiment of the invention.

FIG. 1 shows an input/output (IO) controller 10 having power management logic 14 and an interface 12 to a storage device 18. The storage device 18 could be a hard disk drive (HDD), an optical disk drive (ODD) such as a compact disk rewritable (CD-RW) or a digital versatile disk read only memory (DVD-ROM), and so on. In the illustrated example, the logic 14 has placed a processor 16 in a non-snoopable idle state while the interface 12 is enabled for bus mastering. When the illustrated interface 12 is in the bus mastering mode, it is managing the transfer of storage data between the storage device 18 and the IO controller 10. It should be noted, however, that the storage data transfer sequence may include "overhead" time periods in which no data is being transferred between the IO controller 10 and the storage device 18.

For example, in the case of a HDD access, there may be a certain amount of time required for the read/write heads to move between tracks over the surfaces of the drive's platters. This time is generally referred to as the seek time and is a commonly discussed metric for hard disks. Typical HDD seek times often range anywhere from 2.5 ms (track-to-track) to 23 ms (full stroke) or more. Similarly, an optical disk average seek time, which is defined as the mean amount of time required for the drive to reach a new track approximately half way across the disc's readable area, could be around 85 ms.

Conventional IO controllers do not permit the processor 16 to enter the non-snoopable idle state while the storage interface is in the bus master mode. By enabling the processor 16 to enter the non-snoopable idle state during overhead time periods such as the drive seek periods, the IO controller 10 provides substantial power saving opportunities over conventional approaches. The non-snoopable idle state can enable the processor 16 to achieve reduced leakage current and power consumption, where the term "non-snoopable" is used herein to refer to a condition in which a component having a cache does not support cache coherency in that state. By dynamically forcing the processor 16 into and out of the non-snoopable idle state while the interface 12 is enabled for bus mastering, the IO controller 10 is therefore able to save power in situations where conventional IO controllers would unconditionally prevent such power savings.

The processor idle states could be established in accordance with the Advanced Configuration and Power Interface Specification (ACPI Specification, Rev. 3, Sep. 2, 2004), where processor power states (Cx states) are processor power consumption and thermal management states within a global working state.

For example, while the processor 16 is in the C0 state, it executes instructions, and while the processor 16 is in the C1 state, it is idle and typically has the lowest entry/exit latency. The hardware latency in the C1 state is generally low enough that the operating system (OS) software does not consider the latency aspect of the state when deciding whether to use it. Aside from placing the processor 16 in a non-executing power state, the C1 state may have no other software-visible effects. Hardware aspects of the C1 state may involve the gating of one or more unused clock signals to save power. Another processor power state is the C2 state, which can offer improved power savings over the C1 state. The worst-case hardware latency for the C2 state can be provided via the ACPI system firmware, and the operating software can use this information to determine when the C1 state should be used instead of the C2 state. Aside from placing the processor 16 in a non-executing power state, this state may have no other software-visible effects. Hardware aspects of the C2 state may involve the gating of additional clocks. The processor cache is snoopable during the C0-C2 states.

The processor 16 could also be placed in the C3 state, which can offer improved power savings over the C1 and C2 states. The worst-case hardware latency for this state may also be provided via the ACPI system firmware, where the OS software can use this information to determine when the C2 state should be used instead of the C3 state. While in the C3 state, certain clocks may be shut down and the core voltage may be reduced to a level low enough to conserve more power but high enough for processor's caches to maintain state. In this state, the caches may ignore any snoops. The caches may also be flushed out to the system memory according to the cache coherence policy associated with the C3 state. The cache flush approach is typically not used because of the potentially negative impact to processor performance. Accordingly, conventional solutions use a non-snoopable version of the C3 and deeper states.

Other deeper power states could include a C4 state, in which the core voltage of the processor 16 can be reduced to below the normal operating voltage by approximately 100-200 mV. In each of the C3 (which may be established as a mere transition state to the C4 state) and deeper states, the processor 16 could be said to be in a non-snoopable state because snoops to the processor cache are not permitted. An example of the power levels for some of the Cx states could be as follows for a mobile computing platform having a processor rated at 1600 MHz.

TABLE I

| State | High frequency mode | Low frequency mode |
|-------|---------------------|--------------------|
| C2    | 7.3 W               | 1.8 W              |
| C3    | 5.1 W               | 1.2 W              |
| C4    | 550 mW              | 550 mW             |

Thus, the power savings to be achieved by placing the processor in the C4 state while in bus mastering mode could be substantial. Although certain embodiments may be described with reference to ACPI. Cx states being used as idle states, the embodiments of the invention are not so limited. Indeed, the principles described herein can be useful in any data storage environment in which power consumption is an issue of concern. Notwithstanding, there are a number of embodiments for which ACPI Cx states are well suited.

Figure 2:
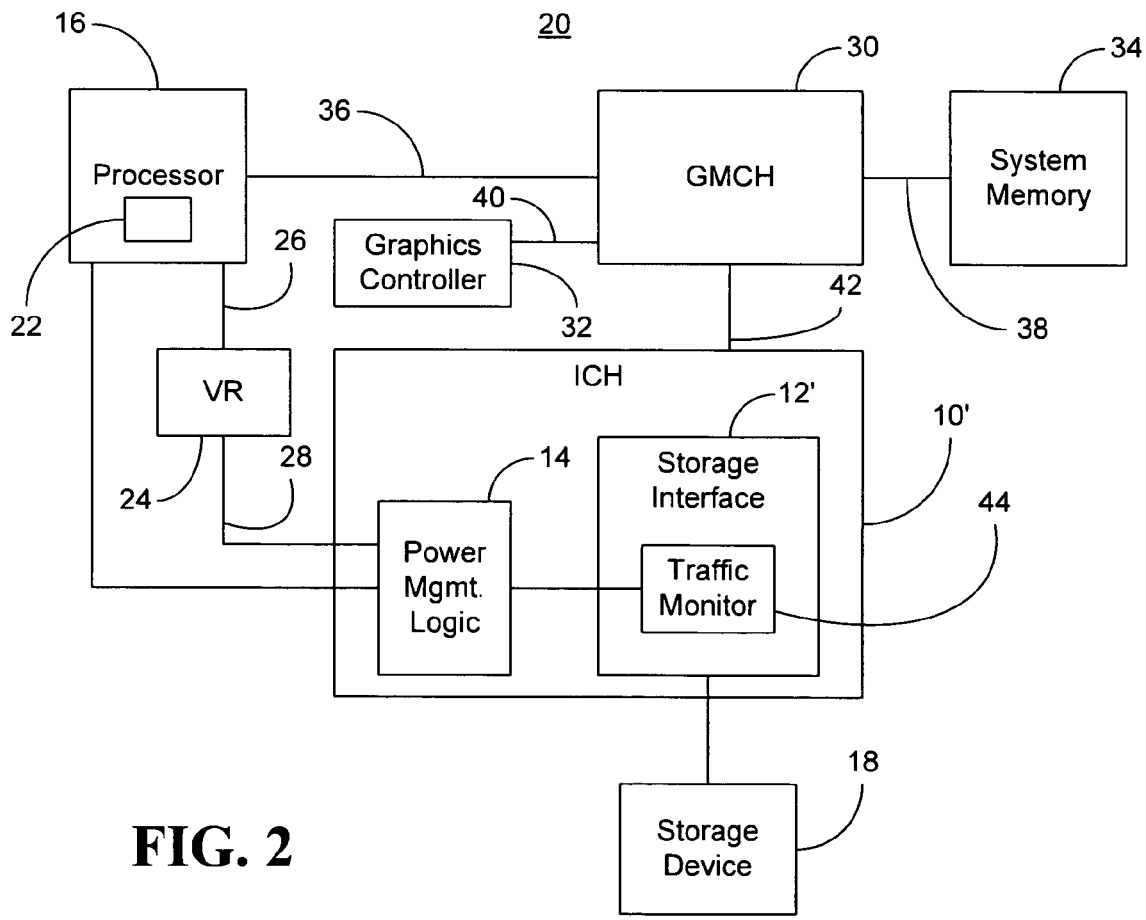
FIG. 2 is a block diagram of an example of a system according to one embodiment of the invention.

Turning now to FIG. 2, a system 20 is shown, where the system 20 could be part of a computing system such as a server, desktop personal computer (PC), notebook PC, personal digital assistant (PDA), wireless "smart" phone, and so on. The illustrated system 20 has a processor 16, an input/output controller hub (ICH) 10' and a storage device 18. The processor 16 could be similar to a Pentium® M processor chip available from Intel Corporation in Santa Clara, Calif., and is shown as having an internal cache 22 such as a level one (L1), level two (L2), trace, data and/or instruction cache. Thus, the illustrated processor 16 is able to execute program code/instructions and can also include instruction fetch units, instruction decoders, execution units, and so on (not shown). Additionally, the processor 16 could have a single core or multi-core architecture.

The processor 16 can also be associated with a voltage regulator 24 that establishes a core voltage 26 for the processor 16. The voltage regulator 24 may reduce the core voltage 26 of the processor 16 in response to a power state control signal 28 from the ICH 10'. Although the power management logic 14 is illustrated as being located on the ICH 10', the power management logic 14 may be located or distributed elsewhere in the system 20 without parting from the spirit and scope of the embodiments described herein. For example, the power management logic 14 could be disposed within the processor 16, so that the processor 16 is able to manage its own power state transitions.

The system 20 may also include a graphics memory controller hub ((G)MCH) 30, a graphics controller 32 and a system memory 34, where the GMCH 30, the ICH 10', and the graphics controller 32 constitute a "chipset", and the processor 16 is located on a separate chip. In one embodiment, the system memory 34 includes dynamic random access memory (DRAM). The DRAM modules of the system memory 34 may be incorporated in to a single inline memory module (SIMM), dual inline memory module (DIMM), small outline DIMM (SODIMM), and so on. The illustrated processor 16 can communicate with the GMCH 30 over an interface such as a front side bus (FSB) 36 or point-to-point fabric interconnection, where the GMCH 30 is sometimes referred to as a Northbridge. The GMCH 30 can communicate with the system memory 34 via a memory bus 38 and with the graphics controller 32 via a graphics bus 40 such as a PCI Express Graphics (PEG, e.g., Peripheral Components Interconnect/PCI Express ×16 Graphics 150 W-ATX Specification 1.0, PCI Special Interest Group) bus or an Accelerated Graphics Port (e.g., AGP V3.0 Interface Specification, September 2002, Intel® Corporation) bus. The GMCH 30 may also communicate with the ICH 10', which may be referred to as a Southbridge, over a hub bus 42. In one embodiment, the hub bus 42 is a DMI (Direct Media Interface) bus.

The illustrated ICH 10' has a storage interface 12' and power management logic 14. The interface 12' could be an integrated device electronics (IDE, e.g., advanced technology attachment/ATA, ANSI INCITS 317-1998, R2003) controller, a serial ATA (SATA, e.g., SATA 1.0a Specification, Feb. 4, 2004, SATA International Organization/SATA-IO) controller, and so on. The illustrated power management logic 14 is able to drive the processor 16 into (i.e., "popdown") and out of (i.e., "pop-up") the non-snoopable idle state while the interface 12' is enabled for bus mastering (e.g., managing a storage data transfer). In particular, the bus mastering may result in traffic between the interface 12' and the storage device 18, where the interface 12' can include a traffic monitor 44 to monitor the traffic and communicate with the power management logic 14. The power management logic 14 can place the processor 16 in the non-snoopable state if the traffic ceases for a period of time and no other conditions exist to prevent pop-down to the non-snoopable state. For example, by defining a timeout value that is substantially shorter than the seek time associated with the storage device 18, ICH 10' enables the processor 16 to reduce its power consumption while the storage device 18 is moving to the appropriate track location and engaged in other overhead activity. When data transfers are ready to occur between the interface 12' and the storage device 18, the power management logic 14 can remove the processor 16 from the non-snoopable idle state so that cache coherency is not negatively affected.

Figure 3:
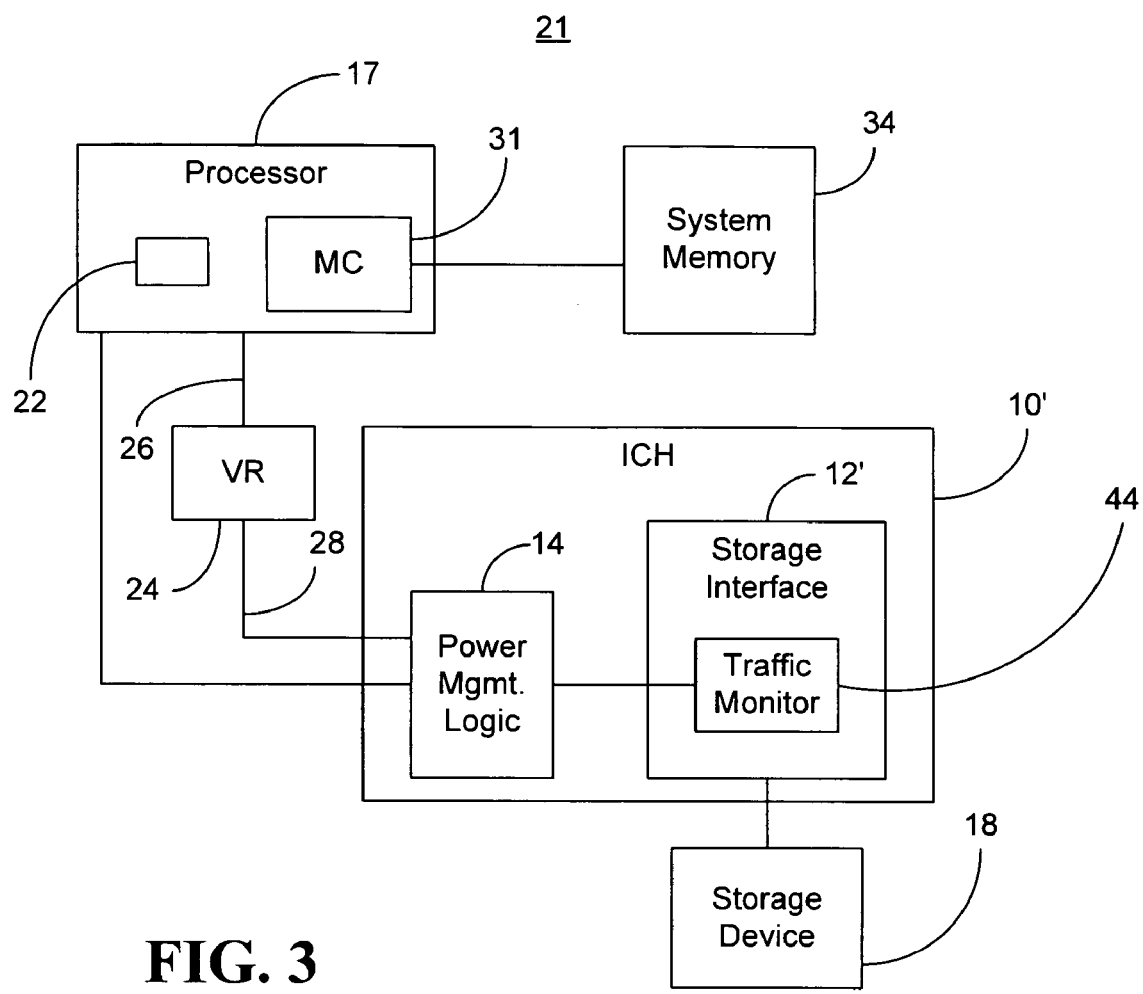
FIG. 3 is a block diagram of an example of a system according to an alternative embodiment of the invention.

FIG. 3 shows an alternative embodiment in which a system 21 includes a processor 17 and a memory controller 31 that are located on the same chip. In the illustrated example, the ICH 10' is disposed on another chip and includes power management logic 14 and a storage interface 12' as already discussed. The voltage regulator 24 may be located on either chip, or on a separate chip.

Turning now to FIG. 4, a timing diagram 46 is shown, where the timing diagram 46 has a storage interface sequence 47 and a processor power control sequence 49. In particular, the storage interface can issue a data transfer command during command period 48. Meanwhile, the processor may be kept in a snoopable state during snoopable period 50. When the data transfer command is sent to the storage device, the storage device can enter the seek mode during seek period 54 and a traffic timeout period 52 may begin to run. The illustrated traffic timeout period 52, is defined to be substantially shorter than the seek time associated with the storage device in order to provide maximum opportunity to pop-down the processor and save power. Thus, the timeout period 52 can expire near the beginning of the seek period 54 and all idle states are permitted in the illustrated pop-down period 56. The result can be significant power savings.

When the storage data transfer is ready to occur, the transfer takes place in transfer period 58, which can be delayed by the amount of time shown as latency period 60. The latency period 60 can be defined by the amount of time required for the processor to exit the non-snoopable idle state (e.g., C3 or C4), and is only used if the processor is actually in the non-snoopable idle state at the end of the seek period 54. Thus, if the processor is in a snoopable idle state (e.g., C2, C1 or C0) at the end of the seek period 54, the storage data transfer could occur without imposing the latency period 60 on the storage interface sequence 47. Typical exit latencies could be approximately 15 μs for the C3 state and approximately 50 μs for the C4 state.

FIG. 5 demonstrates in a timing diagram 62 that a traffic timeout period 52' may be tuned to avoid a sequence in which the non-snoopable exit latency 60' is experienced for each storage data transfer. In this case, the illustrated traffic timeout period 52' has been increased so that it is longer than relatively short idle periods 64. As a result, the non-snoopable pop-down will not occur during these idle periods and the exit latency period 60' will be effectively bypassed. A relatively long idle period 66, however, may still provide an opportunity for the timeout period 52' to expire, where a pop-down to a non-snoopable idle state could occur upon the expiration. If there is concern over reduced performance due to data transfer traffic occurring shortly after the traffic timeout period 52', one alternative would be to disable the traffic monitoring functionality if the system (e.g., notebook PC) is operating on alternating current (AC) power and enable it if the system is operating on battery power. Such an approach could be managed by the basic input output system (BIOS) or by storage driver software.

Figure 6:
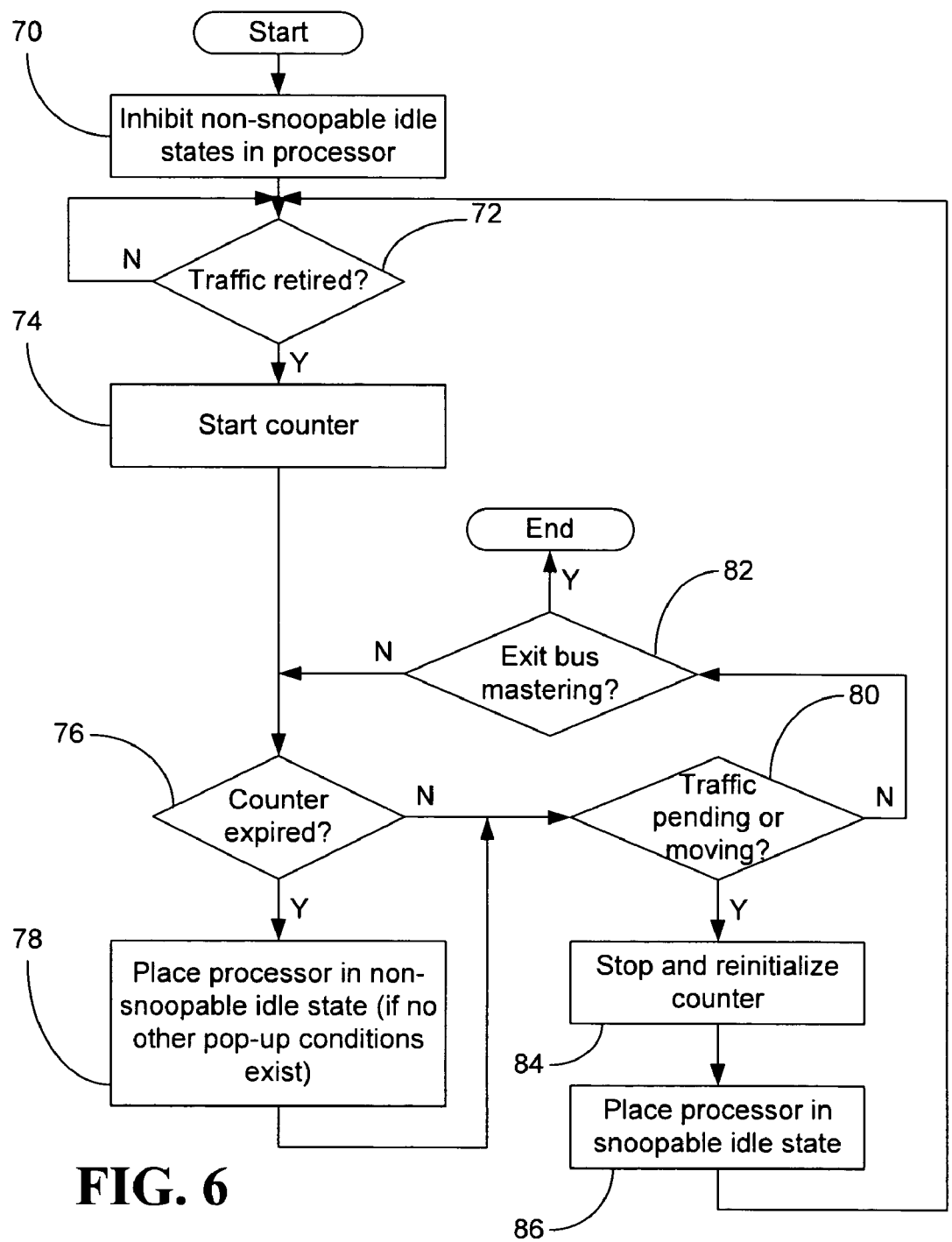
FIG. 6 is a flowchart of an example of a method of managing power consumption according to one embodiment of the invention.

Turning now to FIG. 6, a method of managing power consumption is shown at 68. The illustrated method 68 may be implemented in fixed functionality hardware, microcode, software, or any combination thereof. For example, a particular hardware implementation might involve the use of complementary metal oxide semiconductor (CMOS) technology, which is well established in the semiconductor industry. In particular, the method 68 may be incorporated into an IO controller and called in response to a storage interface entering bus mastering mode. Thus, the illustrated processing block 70 provides for inhibiting non-snoopable idle states in the processor upon entry of the storage interface into the bus mastering mode. If it is determined at block 72 that the initial traffic, which is typically associated with the data transfer command communication, has been sent to the storage device, a counter can be started at block 74. The counter may be assigned a traffic timeout value as already discussed. Otherwise, a loop is provided back to the determination at block 72.

Block 76 provides for determining whether the counter has expired and, if so, the processor can be placed in a non-snoopable idle state at block 78. It should be noted that the pop-down illustrated at block 78 should only occur if no other pop-up conditions (e.g., interrupt/break events, etc.) exist. If it is determined at block 76 that the counter has not yet expired, illustrated block 80 provides for determining whether storage transfer traffic is pending or moving between the storage interface and the storage device. If no traffic is pending or moving, it is determined at block 82 whether the storage interface is ready to or has exited the bus mastering mode. If so, the process ends. Otherwise, a loop is provided back to the determination at block 76 as to whether the counter has expired.

If it is determined at block 80 that storage transfer traffic is either pending or moving between the storage interface and the storage device, illustrated block 84 provides for stopping and reinitializing the counter. The processor can be removed from the non-snoopable idle state at block 86 and a loop can be provided back to the determination at block 72 as to whether the traffic has retired.

The principles described herein can therefore be useful for minimizing aggregate mobile platform power consumption for storage intensive workloads. For example, processors can be placed in deep idle states during storage transfer activities such as DVD playback, audio playback, multimedia content creation/viewing, gaming, and others, without concern over loss of cache coherency.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. A chip comprising:
    an input/output (IO) controller having:
        a traffic monitor to monitor the traffic;
        an interface to storage device; and
        logic to place a processor in a non-snoopable idle state while the interface is enabled for traffic between the interface and the storage device and the traffic ceases for a period of time shorter than a seek time associated with the storage device.

2. The chip of claim 1, wherein the IO controller is to disable the traffic monitor if a system containing the storage interface is operating on alternating current (AC) power.

3. The chip of claim 1, wherein the logic is to remove the processor from the non-snoopable idle state if a data transfer is ready to occur between the interface and the storage device.

4. The chip of claim 3, wherein the logic is to delay the data transfer based on an exit latency associated with the non-snoopable idle state.

5. The chip of claim 1, wherein the interface includes at least one of an integrated device electronics (IDE) controller and a serial advanced technology attachment (SATA) host bus adapter.

6. A method comprising:
    placing a processor in a non-snoopable idle state while a storage interface associated with the processor is enabled for traffic between the interface and a storage device and the traffic ceases for a period of time shorter than a seek time associated with the storage device.

7. The method of claim 6, further including disabling the monitoring if a system containing the storage interface is operating on alternating current (AC) power.

8. The method of claim 6, further including removing the processor from the non-snoopable idle state if a data transfer is ready to occur between the storage interface and a storage device.

9. The method of claim 8, further including delaying the data transfer based on an exit latency associated with the non-snoopable idle state.

10. A system comprising:
    a first chip including a processor with a memory controller; and
    a second chip with an input/output (IO) controller coupled to the processor, the IO controller including;
        a traffic monitor to monitor the traffic;
        an interface to a storage device; and
        logic to place a processor in a non-snoopable idle state while the interface is enabled for traffic between the interface and the storage device and the traffic ceases for a period of time shorter than a seek time associated with the storage device.

11. The system of claim 10, wherein the IO controller is to disable the traffic monitor if the system is operating on alternating current (AC) power.

12. The system of claim 10, wherein the logic is to remove the processor from the non-snoopable idle state if a data transfer is ready to occur between the storage interface and a storage device.

13. The system of claim 12, wherein the logic is to delay the data transfer based on an exit latency associated with the non-snoopable idle state.

14. The system of claim 10, wherein the interface includes at least one of an integrated device electronics (IDE) controller and a serial advanced technology attachment (SATA) host bus adapter.

* * * * *